US012289368B2

(12) United States Patent
Pinczel et al.

(10) Patent No.: US 12,289,368 B2
(45) Date of Patent: Apr. 29, 2025

(54) CHECKING STATE CONSISTENCY IN A LOG REPLICATION CONFIGURATION

(71) Applicant: Telefonaktiebolaget LM Ericsson (PUBL), Stockholm (SE)

(72) Inventors: Balázs Pinczel, Budapest (HU); Dániel Géhberger, Montreal (CA); Péter Mátray, Budapest (HU); Gábor Németh, Budapest (HU); Mate Imre Nagy, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 183 days.

(21) Appl. No.: 18/033,998

(22) PCT Filed: Oct. 29, 2020

(86) PCT No.: PCT/EP2020/080431
§ 371 (c)(1),
(2) Date: Apr. 26, 2023

(87) PCT Pub. No.: WO2022/089749
PCT Pub. Date: May 5, 2022

(65) Prior Publication Data
US 2023/0396673 A1    Dec. 7, 2023

(51) Int. Cl.
*G06F 16/23*    (2019.01)
*G06F 16/27*    (2019.01)
*H04L 67/1095*    (2022.01)

(52) U.S. Cl.
CPC ...... *H04L 67/1095* (2013.01); *G06F 16/2358* (2019.01); *G06F 16/27* (2019.01)

(58) Field of Classification Search
None
See application file for complete search history.

(56) References Cited

U.S. PATENT DOCUMENTS

| 8,938,419 B2 * | 1/2015 | Sustman | G06F 11/1464 707/812 |
| 8,996,468 B1 * | 3/2015 | Mattox | G06F 11/14 707/650 |

(Continued)

OTHER PUBLICATIONS

PCT Notification of Transmittal of the International Search Report and the Written Opinion of the International Searching Authority, or the Declaration issued for International application No. PCT/EP2020/080431—Jul. 23, 2021.

(Continued)

*Primary Examiner* — Eliyah S. Harper
(74) *Attorney, Agent, or Firm* — Baker Botts L.L.P.

(57) ABSTRACT

According to an aspect there is provided a computer-implemented method of operating a leader server in a leader server-follower server log replication configuration. The method comprises (i) storing (801) a current master state of a system and maintaining a master log relating to the current master state, wherein the master log comprises a plurality of log entries each having a respective log index, wherein each log entry indicates a respective change to the master state of the system; (ii) performing (803) a log compaction procedure to remove from the master log any log entry for which the respective change to the master state of the system has been overridden by a change to the master state in a subsequent log entry; (iii) storing (805) a compaction index that is the highest log index of the log entries removed in the log compaction procedure; (iv) storing (807) an override index that is the highest log index of the log entries for which the respective change to the master state overrode a change to the master state by an earlier log entry; and (v) sending (809) the compaction index and the override index to one or more follower servers that are to store a replica of the master log relating to the current master state.

20 Claims, 9 Drawing Sheets

(56) References Cited

U.S. PATENT DOCUMENTS

| | | | | |
|---|---|---|---|---|
| 9,043,294 | B2* | 5/2015 | Nelke | G06F 16/2379 707/696 |
| 9,311,375 | B1* | 4/2016 | Naik | G06F 16/275 |
| 9,430,272 | B2* | 8/2016 | Bezbaruah | G06F 11/1451 |
| 10,235,368 | B2* | 3/2019 | Hsiao | G06F 16/10 |
| 10,599,358 | B2* | 3/2020 | Park | G06F 3/0647 |
| 10,613,988 | B2* | 4/2020 | Gattegno | G06F 12/0875 |
| 10,866,968 | B1* | 12/2020 | Cole | G06F 16/95 |
| 12,013,764 | B2* | 6/2024 | Vig | G06F 11/1471 |
| 12,093,254 | B1* | 9/2024 | Kondiles | G06F 16/2379 |
| 2006/0041640 | A1* | 2/2006 | Lamkin | H04N 21/4325 348/E7.071 |
| 2007/0079364 | A1* | 4/2007 | Abels | H04L 63/126 726/10 |
| 2010/0100334 | A1* | 4/2010 | Otvos | G01R 33/465 702/19 |
| 2015/0120684 | A1* | 4/2015 | Bawaskar | G06F 16/137 707/693 |
| 2016/0246830 | A1* | 8/2016 | Chiu | G06F 16/1734 |
| 2017/0046266 | A1* | 2/2017 | McIlvaine | G06F 12/126 |
| 2017/0366342 | A1* | 12/2017 | Gehrmann | H04L 63/0435 |
| 2018/0357299 | A1* | 12/2018 | Miranda | G06N 5/04 |
| 2019/0026334 | A1* | 1/2019 | Ma | G06F 16/9027 |
| 2019/0188283 | A1* | 6/2019 | Fuller | G06F 16/178 |
| 2019/0377815 | A1* | 12/2019 | Karlberg | G06F 16/22 |
| 2020/0057752 | A1* | 2/2020 | Tofano | G06F 9/54 |
| 2020/0089789 | A1* | 3/2020 | Mace | G06F 9/4881 |

OTHER PUBLICATIONS

Copycat—Novel implementation of the Raft consensus algorithm for Java 8; The Wayback Machine; https://web.archive.org/web/20180207072600/http://atomix.io:80/copycat/docs/log-compaction/—Feb. 2023.

Diego Ongaro and John Ousterhout, Stanford University In Search of an Understandable Consensus Algorithm (Extended Version)—2014.

Diego Ongaro "Consensus: Bridging Theory and Practice" A Dissertation Submitted to the Department of Computer Science and the Committee on Graduate Studies of Stanford University in Partial Fulfillment of the Requirements for the Degree of Doctor of Philosophy—Aug. 2014.

The Wayback Machine—https://web.archive.org/web/20200618170016/https://etcd.io/; A distributed, reliable key-value store for the most critical data of a distributed system—2020.

Raft Library; The Wayback Machine—https://web.archive.org/web/20210804215240/https://github.com/etcd-io/etcd/tree/main—2021.

LogCabin—The Wayback Machine—https://web.archive.org/web/20200627194011/https://github.com/logcabin/logcabin—2020.

Seyed Morteza Mousavi "Log Compacted Topics in Apache Kafka" Apr. 12, 2019.

Guozhang Wang et al. "Building a Replicated Logging System with Apache Kafka"; Proceedings of the VLDB Endowment, vol. 8, No. 12—2015.

* cited by examiner

CHECKING STATE CONSISTENCY IN A LOG REPLICATION CONFIGURATION

PRIORITY

This nonprovisional application is a U.S. National Stage Filing under 35 U.S.C. § 371 of International Patent Application Serial No. PCT/EP2020/080431 filed Oct. 29, 2020 and entitled "CHECKING STATE CONSISTENCY IN A LOG REPLICATION CONFIGURATION," which is hereby incorporated by reference in its entirety.

TECHNICAL FIELD

This disclosure relates to techniques for use with a log replication configuration in which a leader server maintains a log relating to a current state and sends updates to one or more follower servers that maintain a replica log.

BACKGROUND

In recent years, the telecommunications industry has gradually shifted towards applying cloud-based solutions. With the advent of 5th Generation (5G) networks, and the early visions of 6th Generation (6G) networks, this trend is set to continue, and the areas in which such solutions can efficiently be utilised is increasing. As the functions of the network—which were previously implemented as individual physical nodes—are converted to services running in the cloud, new challenges arise in the reliable storage and retrieval of their state, which is data that is required for their (and other nodes) correct operation. To fully benefit from the use of cloud technologies, these services should be small, mostly independent from each other, and most importantly, starting, stopping, or relocating service instances should not disrupt their operation.

A common solution for managing state data for these services while meeting these requirements is to utilise state externalisation. Here, a separate utility is responsible for holding (storing) and managing the state, so that the services themselves can be implemented as stateless 'workers' which turn to (i.e. consult) this utility when they have to read or update their state. Such a utility—while logically presenting itself as centralised—is usually also built from multiple instances, which each hold a replica of the data. Since read and update requests come in to each of these replicas independently, some form of consensus protocol is required to keep the replicas consistent with each other. Consistency is especially important for telecommunications systems (and control plane functions in particular), since they rely heavily on distributed transactions.

To maintain consensus on an evolving state, a family of solutions uses a replicated log (also known as a 'distributed log'). A log is a series of log entries, each describing a specific change to the state. For example if the state is a complete database, a log entry may describe a single update to one data item in the database.

FIG. 1 shows an exemplary log 12, having three log entries 14, 16, 18 for a key-value database. Each log entry 14, 16, 18 is labelled with a respective log index i. The state of the database after each log entry 14 has been applied to the database is shown above the log entries 14. Thus, the first log entry 14 (with log index '1') indicates that a value "x" was added to field A in the database (note that a field in a key-value database is also known as a "key"). After the first log entry 14, the database has a state 20 in which there is a value "x" in field A. The second log entry 16 (with log index '2') indicates that a value "y" was added to data field B in the database. After the second log entry 16, the database has a state 22 in which there is a value "x" in field A and a value "y" in field B. The third log entry 18 (with log index '3') adds a value "z" to data field A in the database. As data field A already has a value "x", the value "z" overwrites the value "x" in data field A. After the third log entry 18, the database has a state 24 in which there is a value "z" in field A and value "y" in field B.

There can be multiple servers in the system, and each server maintains a replica of this log. Each server also maintains a replica of the state, which is initially identical on all servers (usually set to empty) and is evolved by performing the updates described by the log entries.

Consensus protocols used with replicated logs aim to keep the logs identical, even as new entries are added to them. This ensures that the state replica goes through the same history on every server. A common way to synchronise the evolving logs between the servers is to use a leader/follower configuration, where one server has the 'leader' role, which means that it is the only server allowed to add new entries to the log by itself. The rest of the servers are 'followers', and they can only add entries to their log when the leader informs them of a new log entry. Requests to update the state can originate from any server, but these requests have to be forwarded to the leader. When the leader receives a request, it creates a log entry describing the change, and adds it to its replica of the log. Periodically, the leader updates the followers by sending them any newly added log entries. Clients of the system can issue read requests to any of the servers to read the state, and their queries can be answered by any server (follower or leader) based on the local state replica maintained at each server. A popular consensus protocol of this type is known as Raft, as described in "In search of an understandable consensus algorithm" by D. Ongaro & J. Ousterhout, 2014 USENIX ATC 14, pp. 305-319.

Most consensus protocols also have features which enable the transfer of the leader role on-the-fly, without losing consistency of the replicated state and with no (or only minimal) loss of availability, which means that update requests can continue to arrive, even during this transition. This is of course important for practical applications, and most of the challenge in designing consensus protocols comes from this feature.

As noted above, the combination of the distributed log and the leader/follower pattern can achieve consensus on a constantly evolving state, resulting in the same history on all servers. This means that each replica of the state will go through the same values, in the same order. This, however, doesn't necessarily mean that they progress through this state history at the same pace. For example, if the communication between the leader and a follower is temporarily degraded (e.g. due to network congestion) or is unavailable, the follower's state may lag behind that of the others. Once the communication problem is resolved, the leader has to replay (resend) the most recent part of the log (i.e. the most recent log entries) to this follower. In cases the entire log has to be replayed (resent). For example, when a new server is added to the group of follower servers, it has to start from the initial (empty) state and go through the entire history of state changes to become up to date.

For applications where the state goes through frequent updates, the size of the log can easily become a problem. Not only does it occupy space (memory and/or persistent storage) on the servers, but it also increases the time it takes to replay some (or all) of the log, making it harder for lagging or newly joined followers to catch up.

As a solution, various 'log compaction' schemes are available. The common idea in log compaction schemes is to discard or alter some of the old history in the log, yielding a log which is smaller, but still results in the same replicated state if replayed all the way up to the recent entries.

Most log compaction schemes are variants of either a so-called 'snapshotting', or 'log cleaning' approach.

In the snapshotting approach, the servers create a read-only copy of the replicated state, discard the log entries up to the point where this snapshot was made, and replace these log entries with a single "big" log entry which describes or corresponds to the snapshot. This snapshot can be created, for example, periodically, or whenever the log grows over some threshold size (in terms of memory or storage requirements). After the first time a snapshot is made, the log always has the following structure: it begins with a snapshot entry describing a relatively recent state, and then it continues with normal log entries describing updates that happened after (or during) the creation of the snapshot. Newly-joined servers first have to receive and install the snapshot, which could take a while since it usually contains much more data than normal log entries, but in doing so the server has immediately caught up to a recent state.

While the snapshotting approach removes the entire early portion of the log and replaces it with equivalent but more compact data in the form of the snapshot, the log cleaning approach aims to be more granular. In the log cleaning approach, only individual log entries can be removed, and only if they no longer contribute to the current state. In that case there is no need to replace these log entries with anything. The exact interpretation of "an entry no longer contributing to the current state" depends on the application, but it usually means that the log already contains a newer (later) entry which overrides the effect or data of the older log entry.

FIG. 2 shows the effect of a log cleaning approach on the example of FIG. 1. Here, as the effect of the first log entry 14 has been overridden by a later log entry (i.e. the log entry with log index '3' replaces the value of data field A that was set by the first log entry 14), it is fine if a newly-joined server only receives the second and third log entries 16, 18, as the server would still arrive at the correct state (A="z" and B="y"). Thus, the first log entry 14 can be removed from the log.

Other log compaction schemes are available that build on the same underlying principles as snapshotting and log cleaning, with these schemes differing in the specifics of, e.g., the data structure used for a snapshot, how/when snapshotting or log cleaning is scheduled, and how they solve the challenge of serving incoming updates during these operations.

However, the snapshotting approach to log compaction is not lightweight enough to be feasible for the use case of low-latency state externalisation. Creating a snapshot of the entire state is a resource-intensive task and can take a long time if the state is large, during which the normal operation of the consensus protocol (and the application it is embedded in) should also be maintained without suffering any adverse effects. This requires either permanently over-dimensioning the resources for the worst-case scenario of these heavyweight snapshotting events or using a cloud environment with auto-scaling of the virtualised resources to match the periodically increased load. Experience shows that auto-scaling solutions are not necessarily good at adapting to a workload like this, or not at the required time-scale, but even if they improve in the future, it is good practice to avoid relying on them if there are other solutions.

In contrast, if the principles of log cleaning are used, the load of compaction can be spread over time to be more uniform, since the obsolete log entries can be removed as part of normal operation (e.g. immediately after an overriding log entry becomes part of the log), eliminating the need for a periodic heavyweight cleaning task. However, existing log cleaning solutions fail to provide full consistency when replaying from a compacted log. A lagging or newly-joined follower sees only the older parts of the log, where some obsolete log entries may have already been removed, but the corresponding overriding log entries from the recent parts of the log may also be missing until the replay progresses far enough.

For example, consider the key-value database example in FIG. 2. A log cleaning solution may remove the first log entry 14 (the log entry with log index '1') as soon as the third log entry 18 (the log entry with log index '3') becomes part of the log. If a new follower joined at this point, it would only ever receive the second and third log entries 16, 18, as shown in FIG. 3. This means that a newly-joined follower, after updating the state according to the second log entry 16, would have a state 26 in which there is a value "y" in field B, and no value for field A. However, this state never existed for the leader, since after updating the state according to the second log entry 16 the state had a value "x" in field A and a value "y" in field B. Only once the new follower has received the third log entry 18 and updated the state accordingly does the new follower have a state that is consistent with that of the leader.

While the leader can send log entries in batches rather than one at a time, an earlier batch of log entries may not include all the log entries that overrode other log entries (e.g. the first batch of log entries may only include the second log entry 16 in the example of FIG. 3), and the state replica maintained at follower will be inconsistent until the required log entries have been received and acted upon.

Therefore, with a log cleaning approach, the requirement for consistency in the replicated logs and states is violated temporarily.

Thus, neither snapshotting nor log cleaning variants satisfy both the requirements of lightweight and consistent operation, which is needed by the low-latency state externalisation use-case.

SUMMARY

Therefore there is a need for improved techniques for a configuration where a leader server performs log compaction and maintains a compacted log relating to a current state and sends updates to one or more follower servers that maintain a replica of the log and current state. In particular there is a need for improvements in maintaining consistency (or identifying inconsistencies) in replicated log-based consensus protocols that use log compaction.

According to a first aspect, there is provided a computer-implemented method of operating a leader server in a leader server-follower server log replication configuration. The method comprises (i) storing a current master state of a system and maintaining a master log relating to the current master state, wherein the master log comprises a plurality of log entries each having a respective log index, wherein each log entry indicates a respective change to the master state of the system; (ii) performing a log compaction procedure to remove from the master log any log entry for which the respective change to the master state of the system has been overridden by a change to the master state in a subsequent log entry; (iii) storing a compaction index that is the highest log index of the log entries removed in the log compaction procedure; (iv) storing an override index that is the highest log index of the log entries for which the respective change to the master state overrode a change to the master state by an earlier log entry; and (v) sending the compaction index and the override index to one or more follower servers that are to store a replica of the master log relating to the current master state.

According to a second aspect, there is provided a computer-implemented method of operating a follower server in a leader server-follower server log replication configuration. The method comprises (i) storing a replica state of a system and maintaining a replica log relating to the replica state, wherein the replica log comprises a plurality of log entries each having a respective log index, wherein each log entry indicates a respective change to the replica state of the system; (ii) receiving a compaction index and an override index from a leader server that stores a master state of the system and maintains a master log relating to the current master state, wherein the compaction index and the override index relate to a compacted master log resulting from a log compaction procedure at the leader server, wherein the compaction index is the highest log index of any log entries removed in the log compaction procedure, and wherein the override index is the highest log index of any log entries for which the respective change to the master state overrode a change to the master state of an earlier log entry; and (iii) determining if the stored replica state is consistent with a current or previous master state maintained by the leader server based on a highest log index in the stored replica log and one or both of the received compaction index and the received override index.

According to a third aspect, there is provided a computer program product comprising a computer readable medium having computer readable code embodied therein, the computer readable code being configured such that, on execution by a suitable computer or processor, the computer or processor is caused to perform the method according to the first aspect, the second aspect, or any embodiments thereof.

According to a fourth aspect, there is provided an apparatus for use as a leader server in a leader server-follower server log replication configuration. The apparatus is configured to (i) store a current master state of a system and maintaining a master log relating to the current master state, wherein the master log comprises a plurality of log entries each having a respective log index, wherein each log entry indicates a respective change to the master state of the system; (ii) perform a log compaction procedure to remove from the master log any log entry for which the respective change to the master state of the system has been overridden by a change to the master state in a subsequent log entry; (iii) store a compaction index that is the highest log index of the log entries removed in the log compaction procedure; (iv) store an override index that is the highest log index of the log entries for which the respective change to the master state overrode a change to the master state by an earlier log entry; and (v) send the compaction index and the override index to one or more follower servers that are to store a replica of the master log relating to the current master state.

According to a fifth aspect, there is provided an apparatus for use as a follower server in a leader server-follower server log replication configuration. The apparatus is configured to: (i) store a replica state of a system and maintaining a replica log relating to the replica state, wherein the replica log comprises a plurality of log entries each having a respective log index, wherein each log entry indicates a respective change to the replica state of the system; (ii) receive a compaction index and an override index from a leader server that stores a master state of the system and maintains a master log relating to the current master state, wherein the compaction index and the override index relate to a compacted master log resulting from a log compaction procedure at the leader server, wherein the compaction index is the highest log index of any log entries removed in the log compaction procedure, and wherein the override index is the highest log index of any log entries for which the respective change to the master state overrode a change to the master state of an earlier log entry; and (iii) determine if the stored replica state is consistent with a current or previous master state maintained by the leader server based on a highest log index in the stored replica log and one or both of the received compaction index and the received override index.

According to a sixth aspect, there is provided an apparatus for use as a leader server in a leader server-follower server log replication configuration. The apparatus comprises a processor and a memory, said memory containing instructions executable by said processor whereby said apparatus is operative to (i) store a current master state of a system and maintaining a master log relating to the current master state, wherein the master log comprises a plurality of log entries each having a respective log index, wherein each log entry indicates a respective change to the master state of the system; (ii) perform a log compaction procedure to remove from the master log any log entry for which the respective change to the master state of the system has been overridden by a change to the master state in a subsequent log entry; (iii) store a compaction index that is the highest log index of the log entries removed in the log compaction procedure; (iv) store an override index that is the highest log index of the log entries for which the respective change to the master state overrode a change to the master state by an earlier log entry; and (v) send the compaction index and the override index to one or more follower servers that are to store a replica of the master log relating to the current master state.

According to a seventh aspect, there is provided an apparatus for use as a follower server in a leader server-follower server log replication configuration. The apparatus comprises a processor and a memory, said memory containing instructions executable by said processor whereby said apparatus is operative to (i) store a replica state of a system and maintaining a replica log relating to the replica state, wherein the replica log comprises a plurality of log entries each having a respective log index, wherein each log entry indicates a respective change to the replica state of the system; (ii) receive a compaction index and an override index from a leader server that stores a master state of the system and maintains a master log relating to the current master state, wherein the compaction index and the override index relate to a compacted master log resulting from a log compaction procedure at the leader server, wherein the compaction index is the highest log index of any log entries removed in the log compaction procedure, and wherein the override index is the highest log index of any log entries for which the respective change to the master state overrode a change to the master state of an earlier log entry; and (iii) determine if the stored replica state is consistent with a current or previous master state maintained by the leader server based on a highest log index in the stored replica log and one or both of the received compaction index and the received override index.

The above techniques enable follower servers to be aware of the consistency of their replica of the state while a leader server is replaying a compacted log to the follower server. Based on this awareness, it is possible to run servers in a fully consistent mode even when using log compaction, at least from the point of view of clients that can request information about the state. The proposed techniques satisfy both the consistency and lightweight operation requirements of a low-latency state externalisation use-case.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As noted above, in consensus protocols which replicate a log of state-changing events, a lightweight way of keeping the log compact is to remove obsolete log entries after a new overriding log entry becomes part of the log. That is, when a new log entry overrides a change to the state caused by an earlier log entry, that earlier log entry is now obsolete (as the state change the earlier log entry related to is no longer part of the current state). Replaying a compacted log eventually results in the same state being stored in the follower server as if the log was not compacted. However, when a replay hasn't progressed far enough, it may temporarily result in inconsistent states in the follower server which never existed and are just an artefact of the compaction.

In the proposed solution, the leader server for the consensus protocol can share additional information with the follower servers, which allows them to recognise when they may have an inconsistent state while the log is being replayed. Followers that determine that their state is inconsistent can in turn decide to redirect client requests to another server until it reaches a consistent state again.

Figure 4:
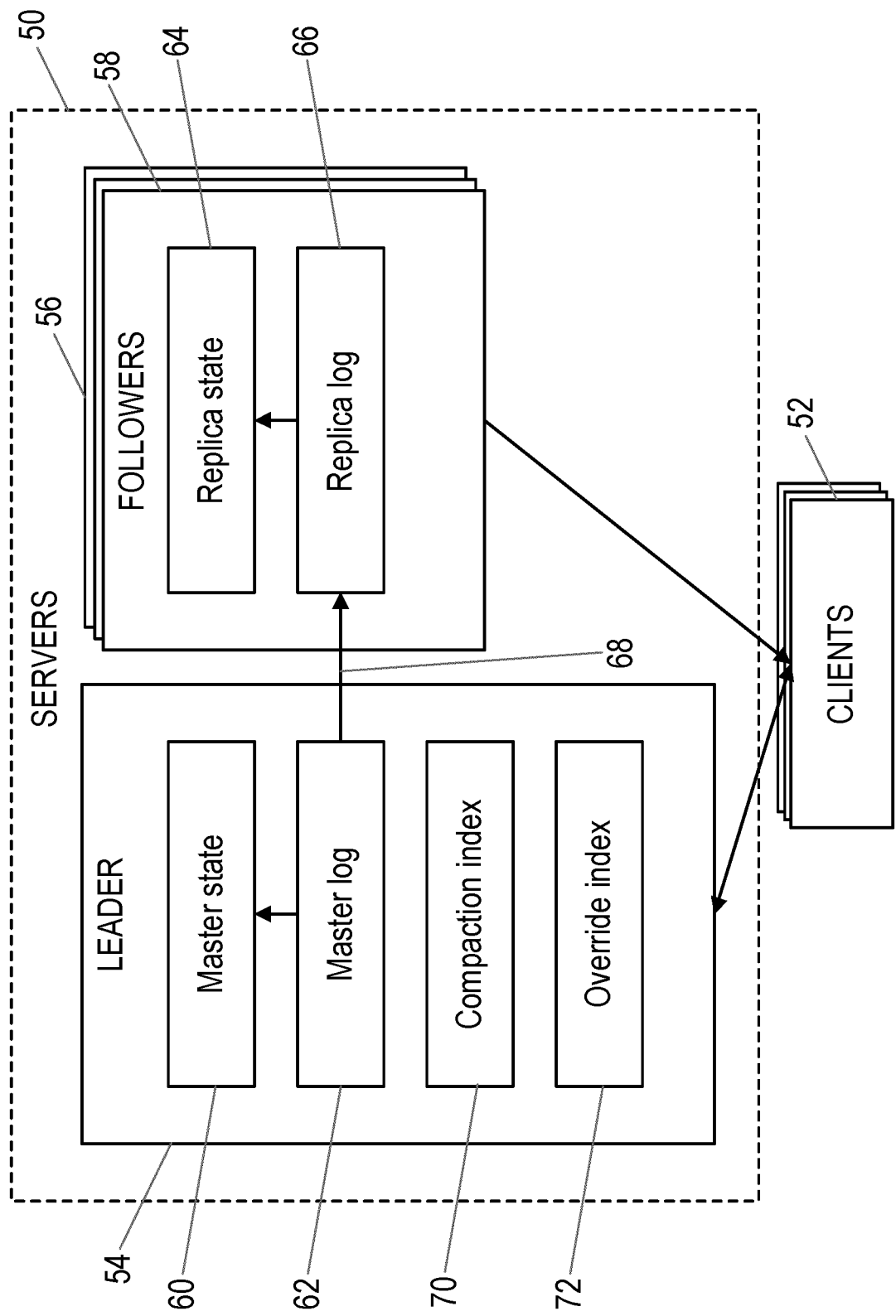
FIG. 4 is an illustration of a set of servers in which the techniques described herein can be implemented and one or more client devices.

FIG. 4 is an illustration of a server-client arrangement in which the techniques described herein can be implemented. FIG. 4 shows a plurality of servers 50 that provide services for or towards one or more client devices 52. Each of the servers 50 maintains and stores a state for a system, and also stores a log that includes log entries relating to the evolution of the state. Thus, each log entry indicates a respective change to the state of the system. Each log entry has a respective log index i identifying the log entry. The log index also relates to the order in which the log entries were added to the log. For example, log index 1 is the first log entry, log index 2 is the second (next) log entry, log index 3 is the third (next) log entry, and so on. The system that the state relates to may be or include one or more of the client devices 52, or the state may relate to a separate system not shown in FIG. 4. In either case, the servers 50 are providing state externalisation for the system to which the state relates.

The set of servers 50 are configured to operate according to a leader/follower configuration in which one server has the leader role and the rest of the servers are followers. Thus, one of the servers 50 is designated as the leader server 54, and the remaining servers 56 are follower servers 58. The leader server 54 stores the state 60 for the system, and also stores a log 62 that comprises one or more log entries relating to the state 60. The state 60 stored by the leader server 54 is also referred to herein as the 'master state', and the log 62 stored by the leader server 54 is also referred to herein as the 'master log'. New log entries received by the leader server 54 are used to update the master state 60 and are stored in the master log 62. As the leader server 54, the leader server 54 is the only server allowed to add new log entries to the master log 62 by itself.

Each follower server 58 stores a replica state 64 for the system, and also stores a replica log 66 that comprises one or more log entries relating to the replica state 64. Each of the follower servers 58 are only able to add entries to their replica log 66 when the leader server 54 informs them of a new log entry, as shown by arrow 68. Each follower server 58 uses the log entries in its replica log 66 to update the stored replica state 64.

It should be noted that the replica state 64 and the replica log 66 stored by a particular follower server 58 are internally consistent, i.e. the replica state 64 at the follower server 58 implements all of the changes indicated by the replica log 66 at that follower server 58, but it is possible that the replica state 64 and the replica log 66 stored by a particular follower server 58 does not match the master state 60 and the master log 62 stored by the leader server 54. In particular, in an ideal situation, each of the follower servers 58 maintains an exact replica of the master state 64 and master log 66 (i.e. the replica state 64 matches the master state 60 at the leader server 54 and the replica log 66 matches the master log 62 at the leader server 54), which means that any of the follower servers 58 can accurately respond to requests from any of the client devices 52 about the current state. However, as noted above, there can be communication issues between the leader server 54 and one or more of the follower servers 58 which means that messages from the leader server 54 to the follower servers 58 about updates the state 60 and log 62 may not be received by that/those follower server(s) 58. As a result, the replica state 64 and the replica log 66 of a follower server 58 can fall behind the master state 60 and master log 62 of the leader server 54. In that case, the leader server 54 has to 'replay' (resend) part of the log 62 to the follower server 58 so the follower server 58 can 'catch up' and allow the replica state 64 and the replica log 66 to match the state 60 and log 62 stored in the leader server 54. Likewise, when a new follower server 58 is created or set up, that new follower server 58 needs to have the full log 62 resent or replayed by the leader server 54 so that it can build the correct replica state 64 and the correct replica log 66.

The leader server 54 implements a log compaction scheme in order to reduce the size of the log 62, and in the embodiments described herein, the leader server 54 uses a log cleaning approach to remove obsolete log entries after a new overriding log entry becomes part of the log 62. That is, when a new log entry overrides a change to the state 60 caused by an earlier log entry, that earlier log entry is now obsolete (as the state change the earlier log entry related to is no longer part of the current state 60).

Figure 3:
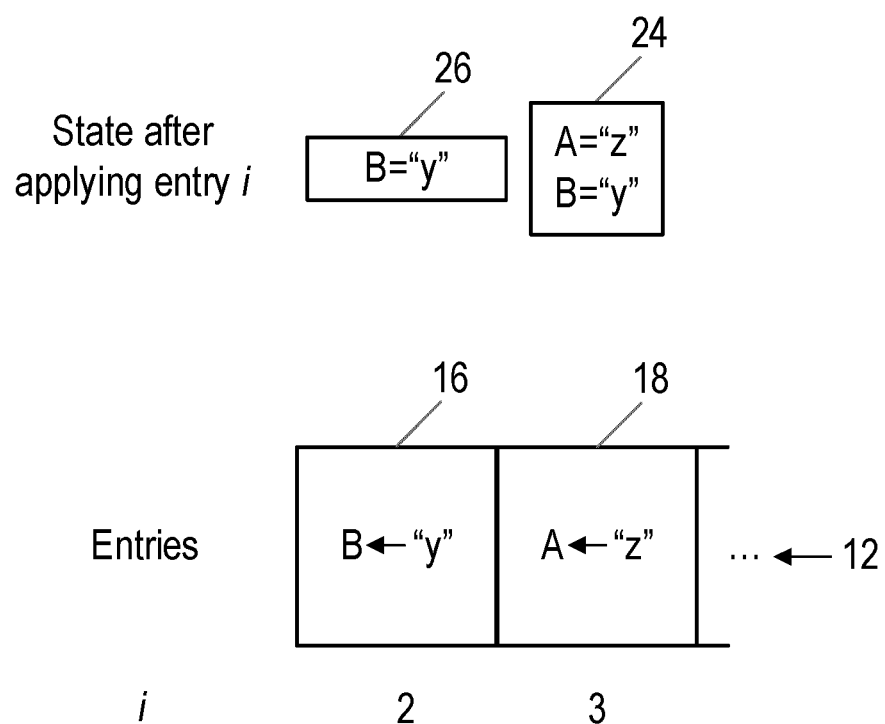
FIG. 3 is an illustration of problems with replaying a compacted log to a follower.

As noted above with reference to FIG. 3, in the case of a log cleaning approach, when the master log 62 is being replayed to a follower server 58, the replica state 64 in the follower server 58 may temporarily be inconsistent with the previous states 60 in the leader server 54 until all of the overriding log entries have been received. It should be noted that the terms 'consistent' and 'inconsistent' as used herein with reference to the master state 60 and the replica state 64 refer to whether the stored replica state 64 matches the master state 60 at the time of the relevant log entry. Thus, the replica state 64 is considered to be inconsistent with the master state 60 when the replica state 64 at a log index a does not match the master state 60 at log index a. However, the replica state 64 is considered to be consistent with the master state 60 if the replica state 64 at a log index b does match the master state 60 at log index b, even if log index b is not the current (latest) log index. That is, the replica state 64 does not have to match the current master state 60 in order for the replica state 64 and the master state 60 to be considered consistent.

The techniques described herein apply to the log cleaning approach for log compaction and enable the follower servers 58 to determine when their replica state 66 is not consistent with the master state 60. As in the existing log cleaning solutions, log entries in the log 62 are removed if they no longer contribute to the current state 60. Specifically, a log entry at log index i should be removed if there is a log entry in the log 62 at some later index k (where k>i) which overrides the effect or data described by log entry i. In the example shown in FIG. 2, the log entry with index k=3 overrides the effect of the log entry with index i=1, and so the log entry with index i=1 is removed. Techniques for keeping track of which log entry overrides which other log entry(ies) can vary from application to application and are not described further herein. For most applications, identifying the earlier log entries that have been overridden can be inferred from the contents of the log entries themselves, e.g. as in the example shown in FIGS. 1-3.

The techniques provide for the leader server 54 to share additional information with the follower servers 58, which allows the follower servers 58 to recognise when they may have an inconsistent state while the master log 62 is being replayed. Followers that determine that their replica state 64 is inconsistent can in turn decide to redirect client requests to another server (follower or leader) until its replica state 64 is consistent with the master state 60.

In particular to allow a follower server 58 to detect inconsistency of its replica state 64 during log replays by the leader server 54, the leader server 54 stores two pieces of information relating to the log cleaning process. The information comprises two indices relating to how far in the master log 62 the compaction (removal of entries) has progressed The first index is referred to herein as a 'compaction index' 70. The compaction index 70 indicates the highest log index where an overridden log entry was removed. That is, of the log entries removed from the master log 62 by the log cleaning process, the compaction index 70 is set to the highest log index of those removed log entries. In the example shown in FIG. 2, the compaction index 70 would be '1', corresponding to the log entry 14 with log index 1, as this was the last (=highest log index) log entry that has been removed due to log cleaning.

The second index is referred to herein as an 'override index' 72. The override index 72 indicates the highest log index of the log entries for which the respective change to the master state 60 overrode a change to the master state 60 by an earlier log entry. The override index 72 therefore keeps track of the log entry with the highest log index that overrode one or more earlier log entries and caused the removal of those one or more earlier log entries from the master log 62. In the example shown in FIG. 2, the override index 72 would be '3', corresponding to the log entry 18 with log index 3, as this was the last (=highest log index) log entry that caused the removal of an earlier log entry (the log entry with log index 1) due to log cleaning.

The compaction index 70 and the override index 72 are initially set to a default value, lower than the log index to be used for the first entry in the master log 62. For example, the default value for the compaction index 70 and the override index 72 can be 0 in the case of a numbered log index system.

In some embodiments, the leader server 54 performs log cleaning each time that a new log entry is added to the master log 62. In alternative embodiments, the leader server 54 can perform log cleaning periodically or intermittently (e.g. once a threshold number of log entries have been added to the master log 62 since the last log clean procedure). In the latter embodiments, the leader server 54 can perform the log cleaning sequentially, for example by evaluating log entries in the order in which they were added to the master log 62. Alternatively, the leader server 54 can perform the log cleaning using a parallel approach (e.g. where the leader server 54 considers multiple log entries for log cleaning at the same time), or non-sequentially (e.g. where the leader server 54 does not evaluate log entries in the order in which they were added to the master log 62.

Whenever a log entry with log index k is identified in the master log 62 that overrides one or more earlier log entries $i_1, \ldots, i_n$, the compaction index 70 and override index 72 should be set as follows:

$$\text{Compaction index} = \max(\text{current compaction index}, i_1, \ldots, i_n) \quad (1)$$

$$\text{Override index} = \max(\text{current override index}, k) \quad (2)$$

Thus, according to (1), the new compaction index 70 is set to the higher of the existing value of the compaction index 70 and $i_1, \ldots, i_n$. According to (2), the override index 72 is set to the higher of the existing value of the override index 72 and k. Where the leader server 54 performs log cleaning sequentially, a log entry k that overrides one or more earlier log entries will exceed the current override index 72 and thus the override index 72 is set to k. If the log entry with log index k does not override any changes caused by previous log entries, the compaction index 70 and the override index 72 remain unchanged from their previously-set values.

It will be appreciated that the compaction index 70 and the override index 72 can be set according to (1) and (2) regardless of whether the leader server 54 performs log cleaning for each received log entry or periodically or intermittently.

As in the existing leader server-follower server log replication configurations, the leader server 54 periodically or intermittently sends the new log entries to the follower servers 58. This message is denoted 'AddLogEntries' herein. In the proposed solution, the leader server 54 also sends the compaction index 70 and the override index 72 to the follower server 58. The compaction index 70 and the override index 72 can be sent in the AddLogEntries message, or in a separate message sent at the same or a similar time to the AddLogEntries message.

A follower server 58 receiving the compaction index 70 and the override index 72 from the leader server 54 can then decide whether its replica state 64 and the replica log 66 are consistent based on the received indices.

If the received compaction index 70 is greater than the highest index existing in the follower server's replica log 66 (before acting on any state changes in any received AddLogEntries message), then this indicates that a compacted part of the master log 62 is being replayed by the leader server 54. Therefore, the replica state 64 built from this follower server's replica log 66 may experience the inconsistency issues described above with reference to FIG. 3. In applications that require strict consistency in the replica state 64, the follower server 58 should not trust its replica state 64, and the follower server 58 should therefore redirect or refuse to serve requests that require a consistent log and state. For example, for an application that uses key-value databases, a follower server 58 with an inconsistent replica state 64 and replica log 66 should not answer read requests.

After processing any state changes indicated in a received AddLogEntries message, if the received override index 72 is less than or equal to the highest index existing in the replica log 66 (including the newly added log entries), then the replica state 64 is consistent with the master state 60, and the follower server 58 can be sure of the consistency of its replica state 64. In that case the follower server 58 can serve requests that require a consistent log and state. If the follower server 58 was previously redirecting or refusing read requests, it can now switch back to normal operation and respond to those requests.

Thus, based on the above, the follower server 58 can determine that its replica state 64 is inconsistent with the master state 60 if:

$$\text{'inconsistent status' if } a < \text{compaction index} \quad (3)$$

where a is the highest log index of the log entries stored in the replica log 66 before acting on any new log entries received from the leader server 54 (and thus before adding those log entries to the replica log 66 and before updating the replica state 64 based on those log entries).

Also based on the above, the follower server 58 can determine that its replica state 64 is consistent with the master state 60 if:

$$\text{'consistent status' if } b \geq \text{override index} \quad (4)$$

where b is the highest log index of the log entries stored in the replica log 66 after acting on any new log entries received from the leader server 54 (and thus after adding those new log entries to the replica log 66 and updating the replica state 64 accordingly.

Each follower server 58 maintains a consistency status with respect to its replica state 64. The consistency status can be 'consistent' or 'inconsistent'. The follower server 58 evaluates the received compaction index 70 and override index 72 to determine if the current consistency status should be maintained or changed according to criterion (3) or criterion (4) above.

Figure 5:
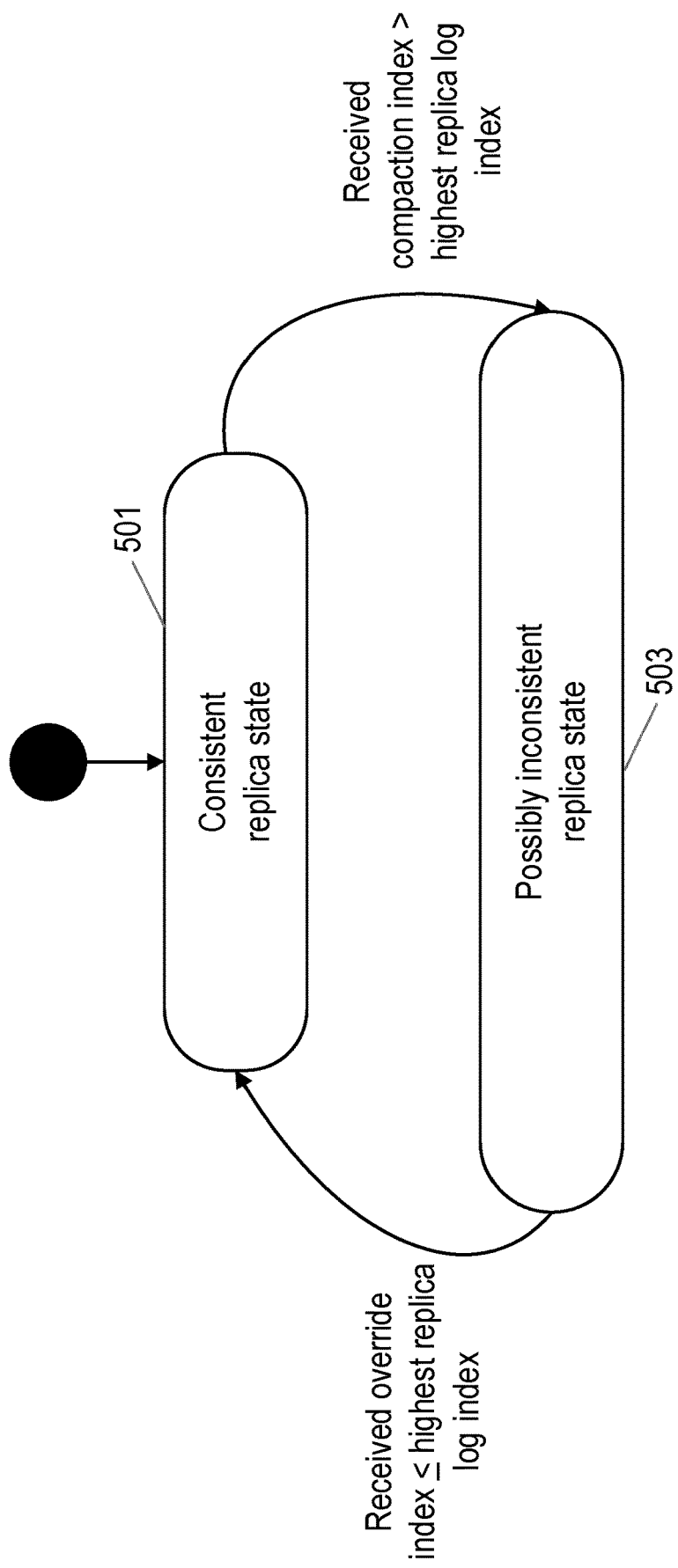
FIG. 5 is an illustration of a consistent status and inconsistent status for a follower server.

The cycling between a consistent status and an inconsistent status for a follower server 58 is illustrated in FIG. 5. FIG. 5 shows a consistent status 501 for the follower server 58 where the replica state 64 is consistent with the master state 60, and an inconsistent status 503 for the follower server 58 where the replica state 64 is inconsistent or possibly inconsistent with the master state 60. The default state for a follower server 58 is the consistent status 501.

A follower server 58 with a previously-determined consistent status 501 for the replica state 64 will maintain that consistent status 501 until criterion (3) is satisfied, i.e. until the highest log entry in the replica log 66 is determined to be below a received compaction index 70. In that case the follower server 58 updates its status to the inconsistent status 503. When a follower server 58 has a consistent status 501 for the replica state 64, the override index 72 (and thus criterion (4)) does not need to be evaluated by the follower server 58.

A follower server 58 with an inconsistent status 503 for the replica state 64 maintains that inconsistent status 503 until criterion (4) is satisfied, i.e. until the highest log entry in the replica log 66 is determined to be equal to or above a received override index 72. In that case the follower server 58 updates its status to the consistent status 501. When a follower server 58 has an inconsistent status 503 for the replica state 64, the compaction index 70 (and thus criterion (3)) does not need to be evaluated by the follower server 58.

The compaction index 70 and the override index 72 are thus used as log entry index thresholds for changing to an inconsistent status and consistent status respectively.

The techniques described herein can be applied to any type of state information about a system, where that state changes over time via updates to the state. In one particular example which relates to a key-value database, the state represents the total information known about the currently existing keys. For example, for each key the database stores metadata about the key and/or its current value. Each log entry can then represent a single update to a single key, e.g. a log entry can signal that a key is initialised (or updated) to a particular value. When applying the log compaction procedure described herein, an overriding log entry is a newer log entry relating to the setting of a key value that overrides older log entries about setting a key value for the same key.

Figure 6:
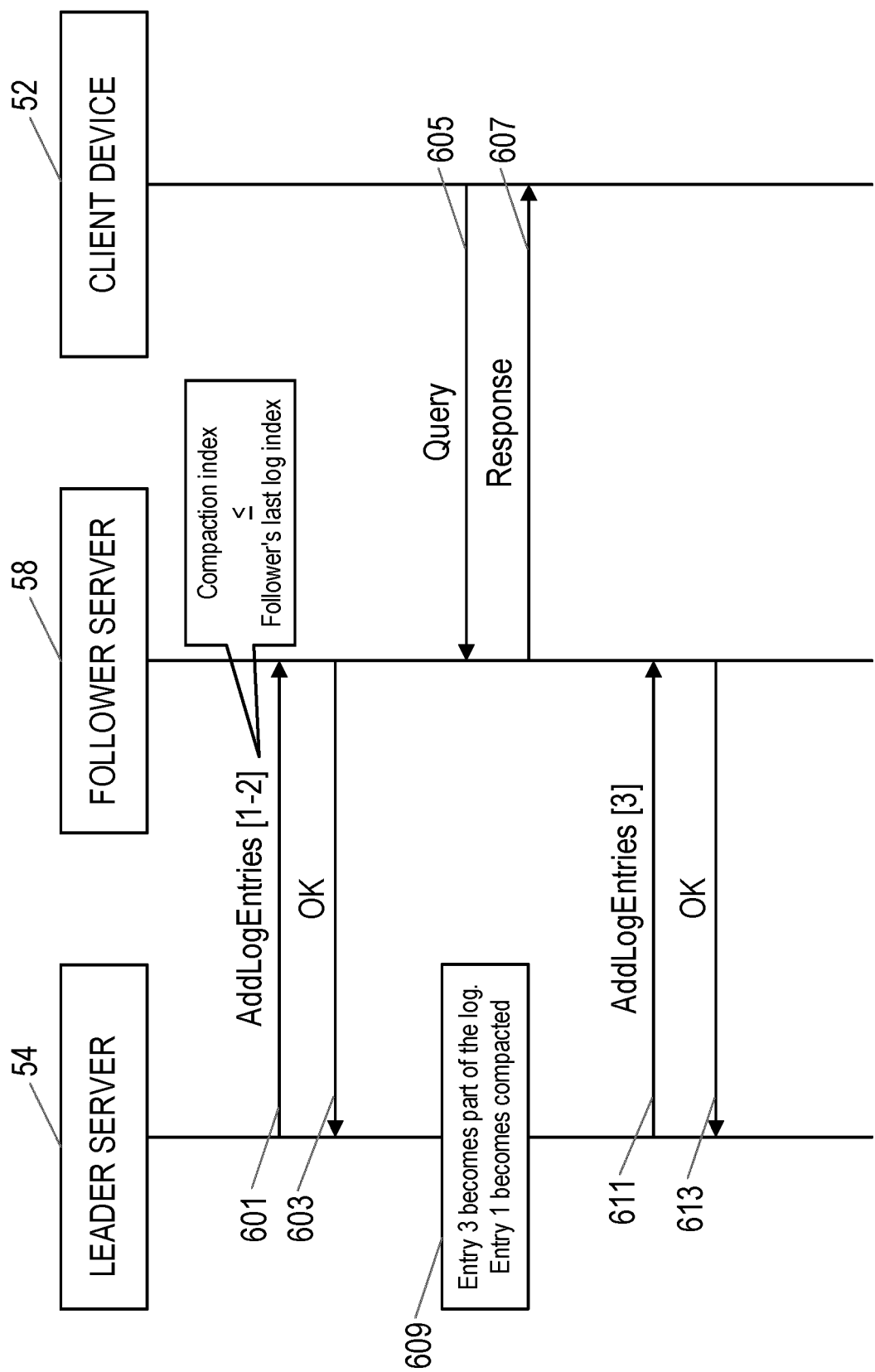
FIG. 6 is a diagram illustrating exemplary signalling between a leader server, a follower server and a client device.

FIG. 6 illustrates exemplary signalling between a leader server 54, a follower server 58 and a client device 52. The signalling in FIG. 6 relates to the example provided in FIGS. 1 and 2. Initially, the master log 62 in the leader server 54 has two log entries (with log indices 1 and 2), and the follower server 58 has an empty replica state 64 and empty replica log 66 (and thus the highest log index stored in the replica log 66 is 0). The status of the follower server 58 is initially set to the 'consistent status'.

Figure 1:
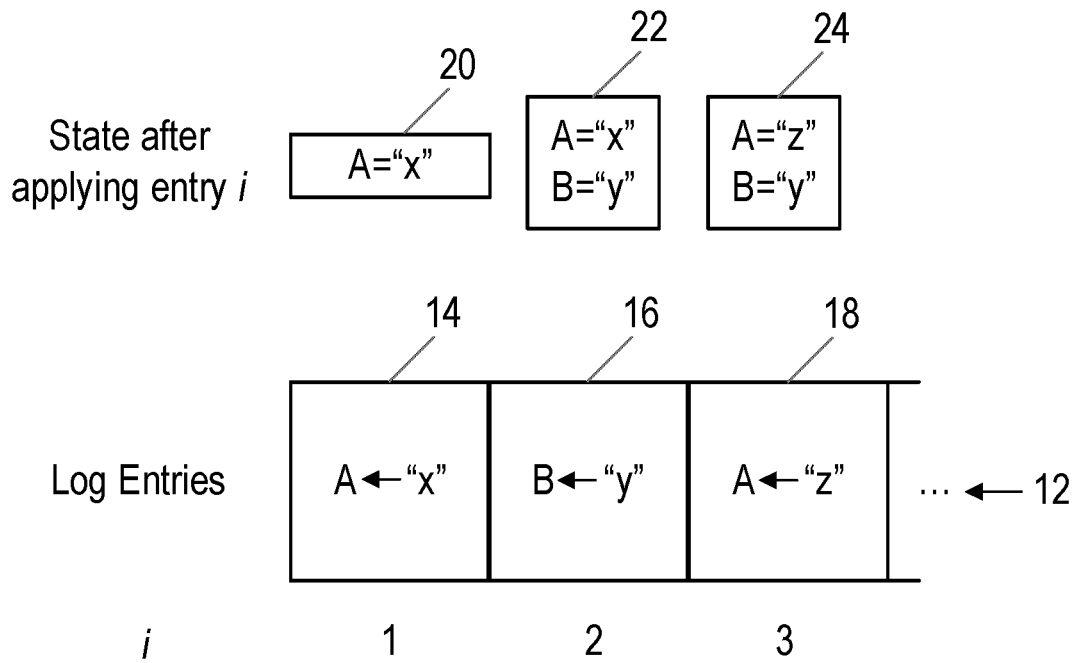
FIG. 1 shows an exemplary log having a number of log entries and the corresponding state of the database after the log entries have been applied.
Figure 2:
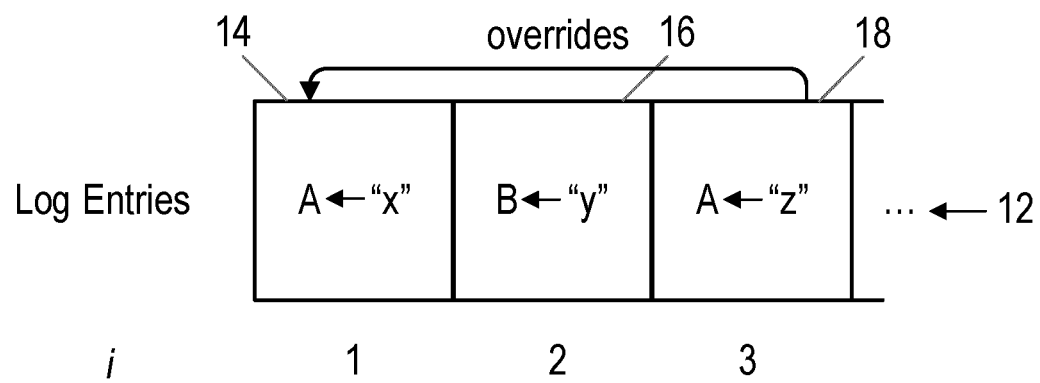
FIG. 2 is an illustration of the application of a log cleaning approach to log compaction for the exemplary log of FIG. 1.

The leader server 54 sends an AddLogEntries message 601 to the follower server 58 that includes the first log entry 14 and the second log entry 16 from FIG. 1. The leader server 54 also sends the compaction index 70 and override index 72 to the follower server 58, for example in the AddLogEntries message 601, or in a separate message that is sent at or around the same time as the AddLogEntries message 601. As no log cleaning has yet taken place, the compaction index 70 has a value of 0 and the override index 72 has a value of 0.

As the follower server 58 has a consistent status, it evaluates criterion (3) and checks the received compaction index 70 against its highest log index in the replica log 66. The highest log index 0 matches the received compaction index 0 and so the follower server 58 maintains the consistent status for its replica state 64. The follower server 58 then adds the received log entries to the replica log 66 and updates the replica state 64 based on the received log entries.

The follower server 58 sends an acknowledgement 603 to the leader server 54 to acknowledge receipt of the AddLogEntries message 601.

Subsequently, the client device 52 sends a query 605 for information about the state. This query 605 is received by the follower server 58. As the follower server 58 has a consistent status, the follower server 58 responds to the query 605 with a response message 607 containing the requested information.

At step 609, the master state 60 is updated and a corresponding third log entry 18 is added to the master log 62. The leader server 54 is able to apply the log cleaning approach to the updated master log 62 with the result that the first log entry 14 (with log index 1) is removed from the master log 62. This log cleaning sets the value of the compaction index 70 to 1 and sets the value of the override index 72 to 3 (since the log entry with log index 3 overwrote the log entry with log index 1).

The leader server 54 sends another AddLogEntries message 611 to the follower server 58 that includes the third log entry 18 from FIG. 1. The leader server 54 also sends the updated compaction index 70 and override index 72 to the follower server 58, for example in the AddLogEntries message 611, or in a separate message that is sent at or around the same time as the AddLogEntries message 611.

The follower server 58 still has a consistent status, so before updating the replica state 64 and the replica log 66, the follower server 58 evaluates criterion (3) using the received compaction index 70 and the current highest log index in the replica log 66. The highest log index 2 is higher than the received compaction index 1 so the follower server 58 maintains the consistent status for its replica state 64. The follower server 58 then adds the received third log entry 18 to the replica log 66 and updates the replica state 64 based on the received log entries. As the follower server 58 has a consistent status, the follower server 58 does not need to evaluate criterion (4).

The follower server 58 sends an acknowledgement 613 to the leader server 54 to acknowledge receipt of the AddLogEntries message 611.

Figure 7:
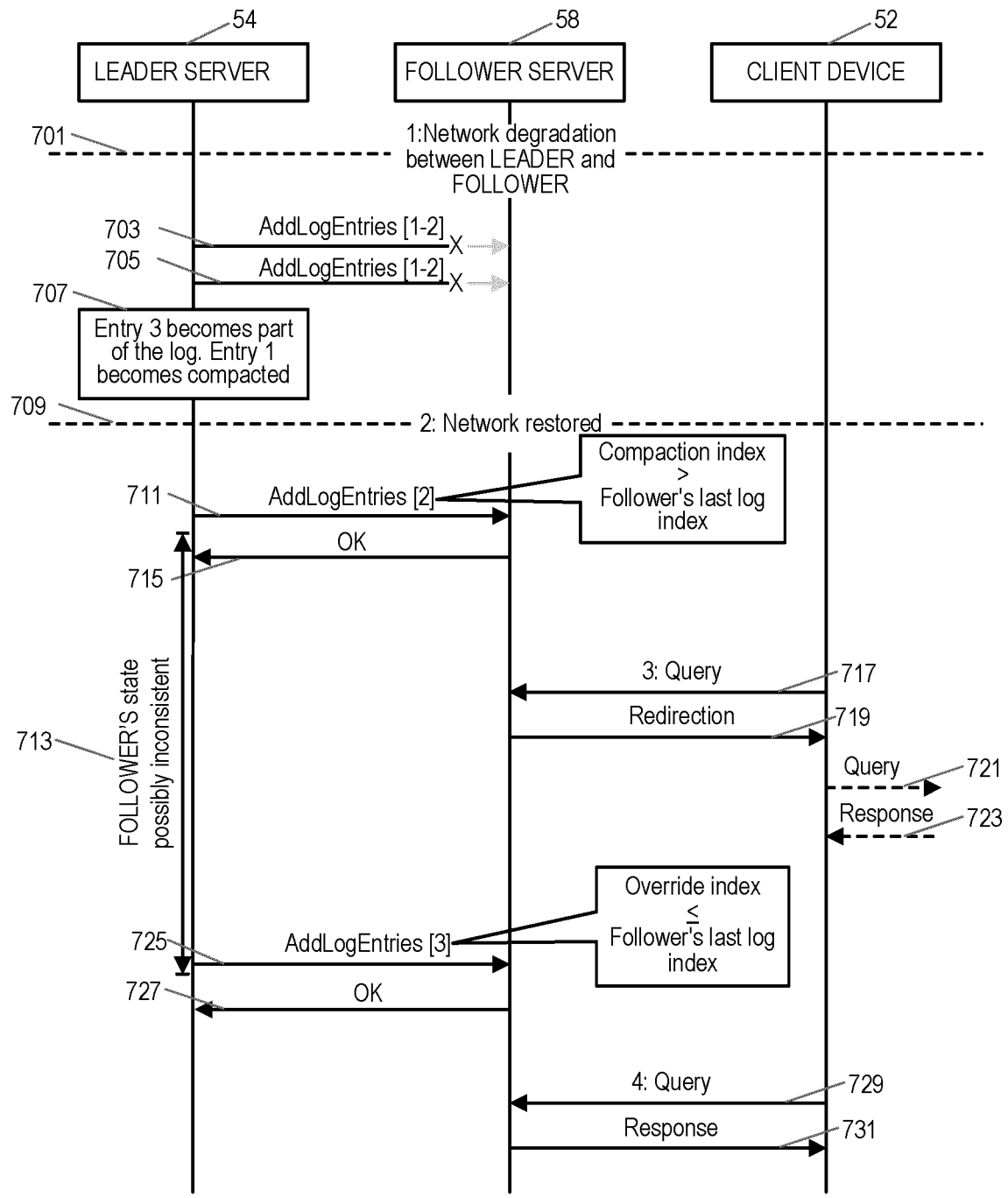
FIG. 7 is a diagram illustrating further exemplary signalling between a leader server, a follower server and a client device.

As noted, FIG. 6 relates to a situation where the follower server 58 is not lagging behind the leader server 54. FIG. 7 illustrates a situation where network degradation causes the follower server 58 to lag far enough behind the leader server 54 that it receives an already compacted part of the log after the communication is restored.

Thus, FIG. 7 illustrates exemplary signalling between a leader server 54, a follower server 58 and a client device 52. The signalling in FIG. 7 relates to the example provided in FIGS. 1 and 2. Initially, the master log 62 in the leader server 54 is empty and contains no log entries. The replica log 66 in the follower server 58 is also empty and contains no log entries. The status of the follower server 58 is initially set to the 'consistent status'.

At step 701 there is network degradation between the leader server 54 and the follower server 58. This network degradation can take any form, but is sufficient to prevent messages sent by the leader server 54 from being received by the follower server 58.

The master log 62 in the leader server 54 is updated to include two log entries (with log indices 1 and 2), and the leader server 54 attempts to send an AddLogEntries message 703 to the follower server 58 that includes the first log entry 14 and the second log entry 16 from FIG. 1. The leader server 54 also attempts to send the compaction index 70 and override index 72 to the follower server 58, for example in the AddLogEntries message 703, or in a separate message that is sent at or around the same time as the AddLogEntries message 703. As no log cleaning has yet taken place, the compaction index 70 has a value of 0 and the override index 72 has a value of 0.

Due to the ongoing network degradation, the follower server 58 does not receive the AddLogEntries message 703 (or any separate message containing the compaction index 70 and override index 72). The leader server 54 therefore does not receive an acknowledgement from the follower server 58 relating to message 703. Optionally, the leader server 54 can resend the message 703 (and any separate message containing the compaction index 70 and override index 72) to the follower server 58. This is indicated by message 705. Again, the follower server 58 does not receive the message(s) 705 due to the network degradation. At this stage, the replica log 66 in the follower server 58 is still empty and contains no log entries. The status of the follower server 58 remains a 'consistent status'.

At step 707, the master state 60 is updated and a corresponding third log entry 18 is added to the master log 62. The leader server 54 is able to apply the log cleaning approach to the updated master log 62 with the result that the first log entry 14 (with log index 1) is removed from the master log 62. Following the log cleaning the value of the compaction index 70 is set to 1 and the value of the override index 72 is set to 3 (since the log entry with log index 3 overwrote the log entry with log index 1). At this time the leader server 54 may not send an AddLogEntries message to the follower server 58 as it is aware of the communication issues therebetween, for example due to the lack of acknowledgements to messages 703 and 705.

At step 709, the connection to the follower server 58 is restored, which enables messages to be sent between the leader server 54 and the follower server 58. The leader server 54 therefore starts to replay (resend) the parts of the master log 62 that the follower server 58 was previously unable to receive. However, the log entry with log index 1 was removed from the master log 62 in step 707, so the leader server 54 is only able to resend the log entries remaining in the master log 62. Thus, the leader server 54 send the second log entry 16 (the log entry with log index 2) to the follower server 58 in an AddLogEntries message 711. The leader server 54 also sends the compaction index 70 and override index 72 to the follower server 58, for example in the AddLogEntries message 711, or in a separate message that is sent at or around the same time as the AddLogEntries message 711. The value of the compaction index 70 is 1 and the value of the override index 72 is 3.

As the follower server 58 currently has a consistent status, it evaluates criterion (3) and checks the received compaction index 70 against its highest log index in the replica log 66. The follower server 58 still has an empty replica log 66, and so the highest log index 0 is less than the received compaction index 1. Therefore the replica state 64 stored in the follower server 58 is potentially inconsistent with the master state 60 and so the follower server 58 updates its status to an inconsistent status for its replica state 64, as indicated by step 713.

The follower server 58 then adds the received second log entry to the replica log 66 and updates the replica state 64 based on the received log entry. As the follower server 58 now has an 'inconsistent' status, after updating the replica state 64 and the replica log 66 based on the received second log entry 16, the follower server 58 evaluates criterion (4) using the received override index 72 and the current highest log index in the replica log 66. After updating the replica log 66, the highest log index is 2, and this is less than the received override index 72 (which is also 3), and so criterion (4) is not satisfied and the status of the follower server 58 remains 'inconsistent'.

The follower server 58 then sends an acknowledgement 715 to the leader server 54 to acknowledge receipt of the AddLogEntries message 711.

Subsequently, the client device 52 sends a query 717 for information about the state. This query 717 is received by the follower server 58. As the follower server 58 has an inconsistent status, the follower server 58 responds to the query 717 with a rejection message or redirection message 719. This message 719 can indicate that the follower server 58 is not able to respond to the query 717, and, in the case of a redirection message, the message 719 can indicate another server (e.g. the leader server 54 or another follower server 58) that the client device 52 can request the information from.

As shown by query 721 and response 723, the client device 52 can request and receive the required state information from another server.

Some time after acknowledgement message 715, the leader server 54 sends an AddLogEntries message 725 to the follower server 58 that includes the third log entry 18 that was added in step 707. The leader server 54 also sends the current compaction index 70 and override index 72 to the follower server 58, for example in the AddLogEntries message 725, or in a separate message that is sent at or around the same time as the AddLogEntries message 725. It will be noted that the follower server 58 also received these same compaction index 70 and override index 72 values in or alongside message 711.

The follower server 58 still has an 'inconsistent' status, so after updating the replica state 64 and the replica log 66 based on the received third log entry 18, the follower server 58 evaluates criterion (4) using the received override index 72 and the current highest log index in the replica log 66. After updating the replica log 66, the highest log index is 3, and this is the same as the received override index 72 (which is also 3), and so criterion (4) is satisfied and the status of the follower server 58 is updated to 'consistent'.

The follower server 58 sends an acknowledgement 727 to the leader server 54 to acknowledge receipt of the AddLogEntries message 725.

Subsequently, the follower server 58 receives a query 729 from a client device 52 for information about the state. As the follower server 58 now has a consistent status, the follower server 58 responds to the query 729 with a response message 731 containing the requested information.

Thus, by using the compaction index 70, the follower server 58 is able to identify the possible inconsistency in the replica state 64, and it can redirect read requests to some other follower server 58 or the leader server 54, until a comparison with the override index 72 in a subsequent message indicates that the follower server 58 can resume normal operation.

It will be appreciated that the examples in FIGS. 6 and 7 are simplified cases, with only a few log entries and the inconsistent status resolved as soon as possible. Real cases might be more complex, for example the inconsistent state may last a long time, and new log entries may get added to the leader server's master log 62 in the meantime, causing the override index 72 to be increased, making the affected follower server 58 require even more catching up in order to achieve a consistent status again.

Figure 8:
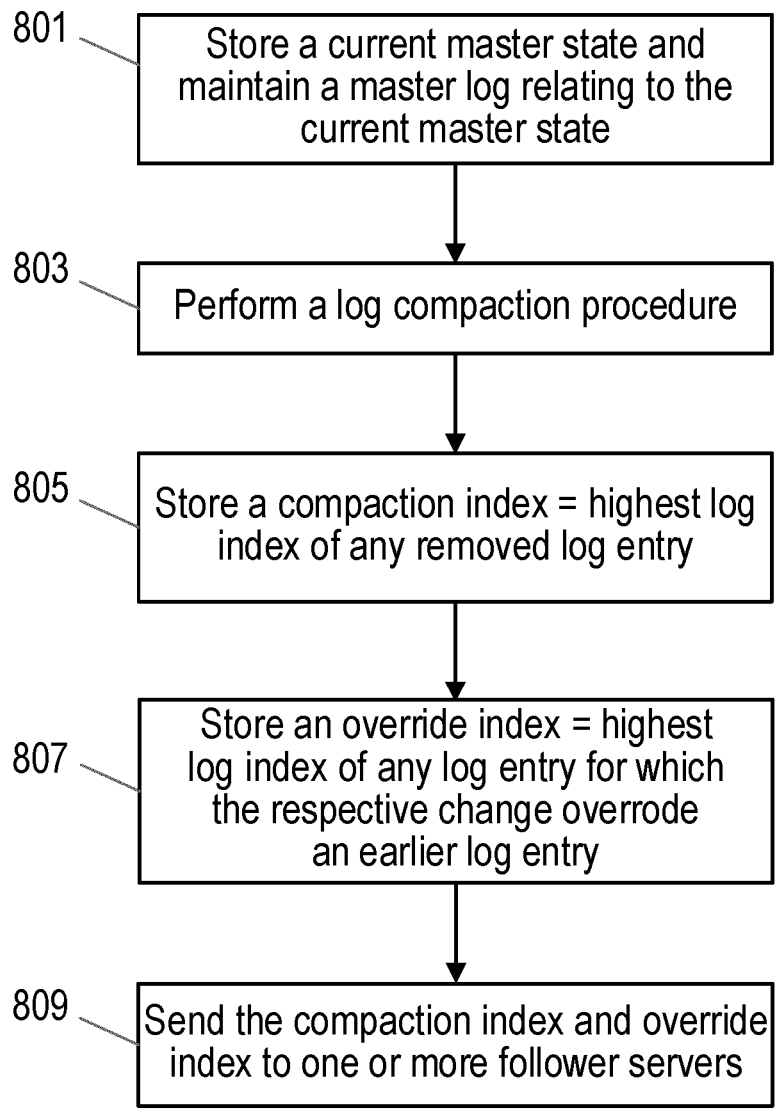
FIG. 8 is a flow chart illustrating a method of operating a leader server according to various embodiments.

The flow chart in FIG. 8 illustrates an exemplary method of operating a leader server 54 according to various embodiments.

In step 801, the leader server 54 stores a current master state 60 of a system. In this step the leader server 54 also maintains (e.g. stores) a master log 62 relating to the current master state 62. As noted above, the master log 62 comprises a plurality of log entries each having a respective log index, with each log entry indicating a respective change to the master state 62 of the system.

In step 803 the leader server 54 performs a log compaction procedure to reduce the size of the master log 62. The log compaction procedure is a log cleaning procedure in which any log entry in the master log 62 for which the respective change to the master state 60 of the system has been overridden by a change to the master state 60 in a subsequent log entry is removed from the master log 62.

In step 805 the leader server 54 stores a compaction index 70. The compaction index 70 is the highest log index of the log entries removed in the log compaction procedure. In embodiments where the log compaction procedure is performed multiple times (e.g. after new log entries are added to the master log 62), the compaction index 70 is the highest log index of any of the log entries removed in any iteration of the log compaction procedure.

In step 807, the leader server 54 stores an override index 72. The override index 72 is the highest log index of the log entries for which the respective change to the master state 60 overrode a change to the master state 60 by an earlier log entry. In embodiments where the log compaction procedure is performed multiple times (e.g. after new log entries are added to the master log 62), the override index 72 is the highest log index of any of the log entries for which the respective change to the master state 60 overrode a change to the master state 60 by an earlier log entry.

Steps 803, 805 and 807 can typically be performed at the same time, and it should be appreciated that steps 805 and 807 do not have to occur in the order shown in FIG. 8.

Finally, in step 809, the leader server 54 sends the compaction index 70 and the override index 72 to one or more follower servers 58 that are to store a replica of the master log 62 relating to the current master state 60.

In some embodiments, the compaction index 70 and the override index 72 are sent to the one or more follower servers 58 when there are changes to the master state 60. In particular, the leader server 54 can receive change information indicating one or more new changes to the master state 60 of the system. The leader server 54 can update the stored master state 60 of the system based on the received change information and update the master log 62 to include one or more respective new log entries for the one or more new changes to the master state 60. The leader server 54 then repeats step 803 on the updated master log 62 to determine if any log entries can be removed from the master log 62, and updates the compaction index 70 and the override index 72 if appropriate for the updated master log 62 (i.e. if any further log entries have been removed by repeating step 803). The leader server 54 then sends the new log entries, the current compaction index 70 and the current override index 72 to the one or more follower servers 58. The respective new log entries, the current compaction index 70 and the current override index 72 can be sent in the same message. This message can be an AddLogEntries message. Alternatively, the current compaction index 70 and the current override index 72 can be sent in a different message to the message containing the new log entries.

In some embodiments, the leader server 54 can replay or resend at least a part of the (compacted) master log 62 to one or more of the follower servers 58. Replaying or resending the compacted master log 62 can comprise sending any log entries added to the master log 62 since the follower server 58 last successfully received a log entry message from the leader server 54. In the case of a new follower server 58, replaying or resending the compacted master log 62 can comprise sending all of the log entries to the new follower server 58. The log entries can be sent in one batch or in multiple batches, starting from the oldest/earliest log entries remaining in the compacted master log 62.

Figure 9:
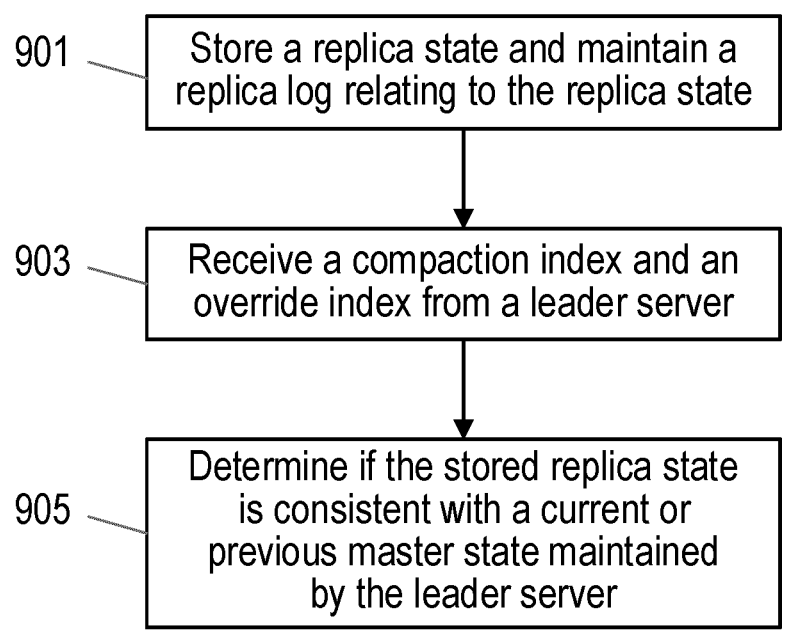
FIG. 9 is a flow chart illustrating a method of operating a follower server according to various embodiments.

The flow chart in FIG. 9 illustrates an exemplary method of operating a follower server 58 according to various embodiments. In a configuration with multiple follower servers 58, each of the follower servers 58 can operate according to the method in FIG. 9.

In step 901, the follower server 58 stores a replica state 64 of a system and maintains a replica log 66 relating to the replica state 64. The replica log 66 comprises a plurality of log entries each having a respective log index, with each log entry indicating a respective change to the replica state 64 of the system.

In step 903, the follower server 58 receives a compaction index 70 and an override index 72 from a leader server 54 that stores a master state 60 of the system and maintains a master log 62 relating to the current master state 62. The compaction index 70 and the override index 72 relate to a compacted master log 62 resulting from a log compaction procedure at the leader server 54. The compaction index 70 is the highest log index of any log entries removed in the log compaction procedure, and the override index 72 is the highest log index of any log entries for which the respective change to the master state 60 overrode a change to the master state 60 of an earlier log entry.

In step 905, the follower server 58 determines if the stored replica state 64 is consistent with a current or previous master state 60 maintained by the leader server 54 based on a highest log index in the stored replica log 66 and one or both of the received compaction index 70 and the received override index 72.

In some embodiments, the follower server 58 can maintain a consistency status with respect to the current master state 60 or a previous master state 60. This consistency status can be either 'consistent' or 'inconsistent'. When the follower server's consistency status is 'consistent', the stored replica state 64 is deemed consistent with a current or previous master state 60 maintained by the leader server 54. When the follower server's consistency status is 'inconsistent', the stored replica state 64 is deemed inconsistent, or possibly inconsistent, with a current or previous master state 60 maintained by the leader server 54.

In some embodiments, step 905 comprises determining that the replica state 64 is inconsistent with the master state 60 if the highest log index in the stored replica log 66 is less than the received compaction index 70. In embodiments where the follower server 58 maintains a consistency status and the status is 'consistent', the follower server's consistency status can remain 'consistent' until the highest log index in the stored replica log 66 is less than the received compaction index 70. Where the follower server's consistency status is already 'inconsistent', the follower server 58 does not need to evaluate the relationship between the highest log index in the stored replica log 66 and the received compaction index 70.

In some embodiments, step 905 comprises determining that the replica state 64 is consistent with the master state 60 if the highest log index in the stored replica log 66 is equal to or greater than the received override index 72. In embodiments where the follower server 58 maintains a consistency status and the status is 'inconsistent', the follower server's consistency status can remain 'inconsistent' until the highest log index in the stored replica log 66 is equal to or greater than the received override index 72. Where the follower server's consistency status is already 'consistent', the follower server 58 does not need to evaluate the relationship between the highest log index in the stored replica log 66 and the received override index 72.

In some embodiments, the method can further comprise the follower server 58 receiving one or more new log entries from the leader server 54. These new log entry(ies) can be received in the same message as the compaction index 70 and override index 72 in step 903, or in a different message. In these embodiments, the compaction index 70 and override index 72 received in step 903 relate to the compacted master log 62 following the addition of those new log entry(ies) to the master log 62.

Where one or more new log entries are received, the follower server 58 can update the replica state 64 and the replica log 66 based on the received one or more new log entries. In these embodiments, step 905 can comprise determining that the updated replica state is consistent with the master state if the highest log index in the updated replica log is equal to or greater than the received override index 72.

In some embodiments, the follower server 58 can receive a request from a client device 52 for information relating to the state of the system. The follower server 58 can determine whether to provide the requested information to the client device 52 based on whether the stored replica state 64 is determined to be consistent with the master state 60. In these embodiments, the follower server 58 can provide the requested information to the client device 52 if the stored replica state 64 is determined to be consistent with the master state 60. The follower server 58 can reject or redirect the request if the stored replica state 64 is not determined to be consistent with the master state 60.

Figure 10:
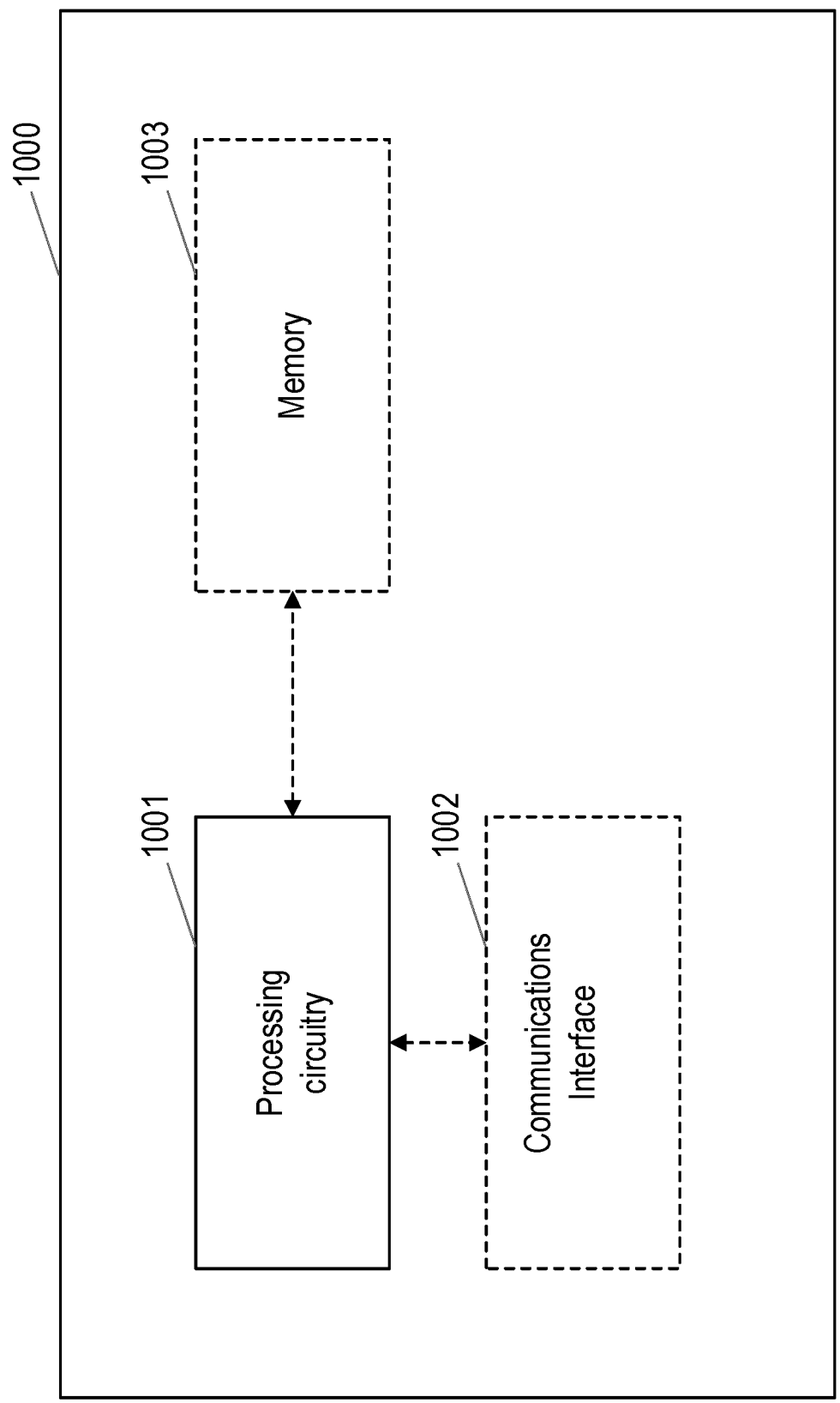
FIG. 10 is a simplified block diagram of an apparatus that can be used to implement a leader server and/or a follower server according to various embodiments.

FIG. 10 illustrates an apparatus 1000 according to various embodiments that can be used to implement a leader server 54 or a follower server 58 as described herein. Multiple apparatuses 1000 can be provided that each implement a respective leader server 54 or follower server 58.

The apparatus 1000 comprises processing circuitry (or logic) 1001. It will be appreciated that the apparatus 1000 may comprise one or more virtual machines running different software and/or processes. The apparatus 1000 may therefore comprise one or more servers, switches and/or storage devices and/or may comprise cloud computing infrastructure that runs the software and/or processes.

The processing circuitry 1001 controls the operation of the apparatus 1000 and can implement the methods described herein in relation to a leader server 54 and/or a follower server 58. The processing circuitry 1101 can comprise one or more processors, processing units, multi-core processors or modules that are configured or programmed to control the apparatus 1000 in the manner described herein. In particular implementations, the processing circuitry 1001 can comprise a plurality of software and/or hardware modules that are each configured to perform, or are for performing, individual or multiple steps of the method described herein in relation to the apparatus 1000.

In some embodiments, the apparatus 1000 may optionally comprise a communications interface 1002. The communications interface 1002 can be for use in communicating with other apparatuses, such as other servers, and/or one or more client devices. For example, the communications interface 1002 can be configured to transmit to and/or receive from other servers or client devices requests, acknowledgements, log entries, the compaction index 70, the override index 72, other information, data, signals, or similar. The processing circuitry 1001 may be configured to control the communications interface 1002 to transmit to and/or receive from other servers or client devices requests, acknowledgements, log entries, the compaction index 70, the override index 72, other information, data, signals, or similar.

Optionally, the apparatus 1000 may comprise a memory 1003. In some embodiments, the memory 1003 can be configured to store program code that can be executed by the processing circuitry 1001 to perform the method described herein in relation to the leader server 54 or the follower server 58. Alternatively or in addition, the memory 1003 can be configured to store any requests, acknowledgements, resources, log entries, the master state 60, the master log 62, the replica state 64, the replica log 66, the compaction index 70, the override index 72, or other information, data, signals, or similar that are described herein. The processing circuitry 1001 may be configured to control the memory 1003 to store such information therein.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A computer-implemented method of operating a leader server in a leader server-follower server log replication configuration, the method comprising:
   (i) storing a current master state of a system and maintaining a master log relating to the current master state, wherein the master log comprises a plurality of log entries each having a respective log index, wherein each log entry indicates a respective change to the master state of the system;
   (ii) performing a log compaction procedure to remove from the master log any log entry for which the respective change to the master state of the system has been overridden by a change to the master state in a subsequent log entry;
   (iii) storing a compaction index that is the highest log index of the log entries removed in the log compaction procedure;
   (iv) storing an override index that is the highest log index of the log entries for which the respective change to the master state overrode a change to the master state by an earlier log entry; and
   (v) sending the compaction index and the override index to one or more follower servers that are to store a replica of the master log relating to the current master state.

2. A method as claimed in claim 1, wherein the method further comprises:
   (vi) receiving change information indicating one or more new changes to the master state of the system;
   (vii) updating the current master state of the system based on the received change information and updating the master log to include respective new log entries for the one or more new changes to the master state;
   (viii) repeating step (ii) on the updated master log, and updating the override index and compaction index, if appropriate, for the updated master log; and
   (ix) sending the respective new log entries, the current compaction index and the current override index to the one or more follower servers.

3. A method as claimed in claim 1, wherein the method further comprises:
   replaying or resending at least a part of the master log to one or more of the follower servers.

4. A computer-implemented method of operating a follower server in a leader server-follower server log replication configuration, the method comprising:
   (i) storing a replica state of a system and maintaining a replica log relating to the replica state, wherein the replica log comprises a plurality of log entries each having a respective log index, wherein each log entry indicates a respective change to the replica state of the system;
   (ii) receiving a compaction index and an override index from a leader server that stores a master state of the system and maintains a master log relating to the current master state, wherein the compaction index and the override index relate to a compacted master log resulting from a log compaction procedure at the leader server, wherein the compaction index is the highest log index of any log entries removed in the log compaction procedure, and wherein the override index is the highest log index of any log entries for which the respective change to the master state overrode a change to the master state of an earlier log entry; and
   (iii) determining if the stored replica state is consistent with a current or previous master state maintained by the leader server based on a highest log index in the stored replica log and one or both of the received compaction index and the received override index.

5. A method as claimed in claim 4, wherein the method further comprises:
   maintaining a consistency status with respect to the current or a previous master state, wherein the consistency status is consistent when the stored replica state is considered consistent with a current or a previous master state, and the consistency status is inconsistent when the stored replica state is considered inconsistent, or possibly inconsistent, with a current or a previous master state.

6. A method as claimed in claim 4, wherein the step of determining if the stored replica state is consistent with the master state comprises:
   determining that the replica state is consistent with the master state if the highest log index in the stored replica log is equal to or greater than the received override index.

7. A method as claimed in claim 4, wherein step (ii) further comprises receiving one or more new log entries from the leader server; and
   wherein the method further comprises updating the replica state of the system and the replica log based on the received one or more new log entries.

8. A method as claimed in claim 4, wherein the method further comprises:
- receiving a request from a client device for information relating to the state of the system; and
- determining whether to provide the requested information to the client device based on whether the stored replica state is determined to be consistent with the master state.

9. An apparatus for use as a leader server in a leader server-follower server log replication configuration, the apparatus comprising a processor and a memory, said memory containing instructions executable by said processor whereby said apparatus is operative to:
- (i) store a current master state of a system and maintaining a master log relating to the current master state, wherein the master log comprises a plurality of log entries each having a respective log index, wherein each log entry indicates a respective change to the master state of the system;
- (ii) perform a log compaction procedure to remove from the master log any log entry for which the respective change to the master state of the system has been overridden by a change to the master state in a subsequent log entry;
- (iii) store a compaction index that is the highest log index of the log entries removed in the log compaction procedure;
- (iv) store an override index that is the highest log index of the log entries for which the respective change to the master state overrode a change to the master state by an earlier log entry; and
- (v) send the compaction index and the override index to one or more follower servers that are to store a replica of the master log relating to the current master state.

10. An apparatus as claimed in claim 9, wherein the apparatus is further operative to:
- (vi) receive change information indicating one or more new changes to the master state of the system;
- (vii) update the current master state of the system based on the received change information and updating the master log to include respective new log entries for the one or more new changes to the master state;
- (viii) repeat operation (ii) on the updated master log, and updating the override index and compaction index, if appropriate, for the updated master log; and
- (ix) send the respective new log entries, the current compaction index and the current override index to the one or more follower servers.

11. An apparatus as claimed in claim 10, wherein the respective new log entries, the current compaction index and the current override index are sent in the same message.

12. An apparatus as claimed claim 9, wherein the apparatus is further operative to:
- replay or resend at least a part of the master log to one or more of the follower servers.

13. An apparatus for use as a follower server in a leader server-follower server log replication configuration, the apparatus comprising a processor and a memory, said memory containing instructions executable by said processor whereby said apparatus is operative to:
- (i) store a replica state of a system and maintaining a replica log relating to the replica state, wherein the replica log comprises a plurality of log entries each having a respective log index, wherein each log entry indicates a respective change to the replica state of the system;
- (ii) receive a compaction index and an override index from a leader server that stores a master state of the system and maintains a master log relating to the current master state, wherein the compaction index and the override index relate to a compacted master log resulting from a log compaction procedure at the leader server, wherein the compaction index is the highest log index of any log entries removed in the log compaction procedure, and wherein the override index is the highest log index of any log entries for which the respective change to the master state overrode a change to the master state of an earlier log entry; and
- (iii) determine if the stored replica state is consistent with a current or previous master state maintained by the leader server based on a highest log index in the stored replica log and one or both of the received compaction index and the received override index.

14. An apparatus as claimed in claim 13, wherein the apparatus is further operative to:
- maintain a consistency status with respect to the current or a previous master state, wherein the consistency status is consistent when the stored replica state is considered consistent with a current or a previous master state, and the consistency status is inconsistent when the stored replica state is considered inconsistent, or possibly inconsistent, with a current or a previous master state.

15. An apparatus as claimed in claim 13, wherein the apparatus is operative to determine that the replica state is inconsistent with the master state if the highest log index in the stored replica log is less than the received compaction index.

16. An apparatus as claimed in claim 13, wherein the apparatus is operative to determine that the replica state is consistent with the master state if the highest log index in the stored replica log is equal to or greater than the received override index.

17. An apparatus as claimed in claim 13, wherein operation (ii) further comprises receiving one or more new log entries from the leader server; and
- wherein the apparatus is further operative to update the replica state of the system and the replica log based on the received one or more new log entries.

18. An apparatus as claimed in claim 17, wherein operation (iii) comprises determining that the updated replica state is consistent with the master state if the highest log index in the updated replica log is equal to or greater than the received override index.

19. An apparatus as claimed in claim 13, wherein the apparatus is further operative to:
- receive a request from a client device for information relating to the state of the system; and
- determine whether to provide the requested information to the client device based on whether the stored replica state is determined to be consistent with the master state.

20. An apparatus as claimed in claim 19, wherein the apparatus is operative to provide the requested information to the client device if the stored replica state is determined to be consistent with the master state, and reject or redirect the request if the stored replica state is not determined to be consistent with the master state.

* * * * *